United States Patent
Genty De La Sagne

(10) Patent No.: US 10,597,136 B2
(45) Date of Patent: Mar. 24, 2020

(54) AIRCRAFT BRACE HOUSING A FLUID TRANSFER LINE

(71) Applicant: Airbus Operations (S.A.S.), Toulouse (FR)

(72) Inventor: Jaime Genty De La Sagne, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 420 days.

(21) Appl. No.: 15/387,942

(22) Filed: Dec. 22, 2016

(65) Prior Publication Data

US 2017/0183080 A1    Jun. 29, 2017

(30) Foreign Application Priority Data

Dec. 23, 2015 (FR) ..................... 15 63255

(51) Int. Cl.
| | | |
|---|---|---|
| *B64C 1/26* | (2006.01) | |
| *B64D 27/02* | (2006.01) | |
| *B64D 29/02* | (2006.01) | |
| B64D 13/00 | (2006.01) | |
| B64D 15/04 | (2006.01) | |
| B64D 37/00 | (2006.01) | |

(52) U.S. Cl.
CPC ............. *B64C 1/26* (2013.01); *B64D 27/02* (2013.01); *B64D 29/02* (2013.01); *B64D 13/00* (2013.01); *B64D 15/04* (2013.01); *B64D 37/005* (2013.01); *B64D 2221/00* (2013.01)

(58) Field of Classification Search
CPC ............................ B64D 37/04; B64D 37/005
See application file for complete search history.

(56) References Cited

U.S. PATENT DOCUMENTS

| | | | | |
|---|---|---|---|---|
| 3,258,228 A | * | 6/1966 | Crook ..................... | B64D 5/00 244/46 |
| 5,899,416 A | * | 5/1999 | Meister ................... | B64C 21/06 244/207 |
| 8,336,811 B2 | | 12/2012 | Cazals et al. | |
| 2007/0108344 A1 | * | 5/2007 | Wood ....................... | B64C 7/00 244/102 R |
| 2010/0059623 A1 | * | 3/2010 | Cazals ..................... | B64C 1/26 244/46 |

(Continued)

FOREIGN PATENT DOCUMENTS

| | | |
|---|---|---|
| FR | 2935351 A1 | 3/2010 |
| FR | 2991287 A1 | 12/2013 |

OTHER PUBLICATIONS

French Search Report for Application 1563255 dated Aug. 25, 2016.

(Continued)

*Primary Examiner* — Philip J Bonzell
*Assistant Examiner* — Tye William Abell
(74) *Attorney, Agent, or Firm* — Jenkins, Wilson, Taylor & Hunt, P.A.

(57) ABSTRACT

An aircraft including a wing, a fuselage and at least one brace extending between the wing and the fuselage. The brace houses at least one fluid transfer line between the wing and the fuselage, such as an engine air bleed line, a hydraulic line or a fuel pipe. Use in particular to equip high-winged aircraft.

20 Claims, 2 Drawing Sheets

(56) References Cited

U.S. PATENT DOCUMENTS

| | | | |
|---|---|---|---|
| 2010/0170993 A1* | 7/2010 | Misegades | B64C 7/00 |
| | | | 244/130 |
| 2010/0200703 A1* | 8/2010 | Cazals | B64C 39/068 |
| | | | 244/45 R |
| 2018/0265208 A1* | 9/2018 | Yousef | B64C 21/06 |

OTHER PUBLICATIONS

Dornier Seaplane Company: "SEASTAR CD 2 Amphibious Flying Boat Description & Specification—Preliminary," Oct. 1, 2008, XP055296478, Extrait de l'Internet: URL: http://avron.ru/public/page_files/Opisanie_i_specifikaciya.pdf [extrait le Aug. 19, 2016].

* cited by examiner

AIRCRAFT BRACE HOUSING A FLUID TRANSFER LINE

CROSS-REFERENCE TO RELATED APPLICATION

This application claims priority to French Patent Application No. 1563255 filed on Dec. 23, 2015, which is incorporated by reference herein in its entirety.

TECHNICAL FIELD

The present disclosure relates to an aircraft comprising a wing, a fuselage and at least one brace which extends between the wing and the fuselage.

BACKGROUND

In a general manner, the present disclosure is used in aircraft which have a braced wing and in which a brace extends between the wing and the fuselage at each side of the aircraft. More specifically, this configuration is observed in high-winged aircraft, that is to say, in which the wing is connected in an upper portion of the fuselage. The configuration is also observed in aircraft having wings of great extent, in particular prioritized to improve the fuel consumption of the aircraft. As a result of the great wingspan of the wing, rigid braces which are intended to support and distribute the loads applied to the wing are used.

Rigid braces are also used in high-winged aircraft using engines which have great diameters and which are received under each wing member, and, for example, a propeller type turboprop having a large diameter or a turbofan with a high level of dilution and therefore having a large diameter.

A brace is thus positioned at each side of the fuselage between the wing member and a lower portion of the fuselage. To this end, the brace is formed by a profile-member which extends longitudinally between a connection zone in the region of the wing and a connection zone with respect to the fuselage. In practice, each brace receives loads from the wing and transmits those loads to the fuselage.

The loads transmitted in this manner by the brace are mainly compression and/or traction forces. The brace which is loaded by compression forces must not become deformed between the wing and the fuselage and must in particular withstand buckling.

The structure of the brace is thus dimensioned mainly taking into account the loads to be supported in the aircraft during flight.

Furthermore, an aircraft is provided with one or more fluid transfer lines between the wing and the fuselage and more specifically between engines which are mounted under the wing and the fuselage. By way of non-limiting examples, an aircraft comprises an engine air removal line, a fuel pipe, a hydraulic line, etc.

To this end, an aircraft comprises a plurality of systems for routing fluid lines, being routed in each wing and being introduced in the region of the root in a pressurized zone of the cabin of the fuselage.

SUMMARY

An object of the present disclosure is to simplify the routing of a fluid transfer line between the wing and the fuselage. To this end, the present disclosure relates to an aircraft comprising a fuselage, a wing which is connected in the upper portion of the fuselage and at least one brace which extends between the wing and a lower portion of the fuselage.

According to the disclosure herein, the brace houses at least one fluid transfer line between the wing and the fuselage.

In this manner, by a fluid transfer line being integrated in a brace which connects the wing and the fuselage, the introduction and routing of fluid circulation pipes along the wing member and in particular in the root zone, is prevented as well as the introduction of those pipes in a pressurized zone of the cabin of the aircraft.

Furthermore, with the brace forming a rectilinear connection between the wing and the fuselage, the length of the routing of the fluid transfer line is significantly reduced. The production thereof is thus simplified and the cost and the mass of the aircraft are reduced.

The routing of a fluid transfer line is simplified, avoiding some critical passages in primary structural zones of the aircraft and preventing the pressurized zone of the cabin of the fuselage from being crossed.

Consequently, the design and certification of the above-mentioned zones are not affected by the routing of the fluid transfer line.

According to different features and embodiments of the disclosure herein, which may be taken alone or in combination:

- the brace comprises a central portion, a front portion which carries a leading edge and a rear portion which carries a trailing edge, the at least one fluid transfer line extending in the front portion which carries the leading edge and/or in the rear portion which carries the trailing edge;
- the brace comprises at least a first fluid transfer line in the front portion which carries the leading edge and at least a second fluid transfer line in the rear portion which carries the trailing edge;
- the brace houses a plurality of fluid transfer lines in a plurality of partitioned zones, respectively, which extend in accordance with the length of the brace;
- the brace is fixed to the wing;
- an engine is mounted on the wing, the brace being fixed to a nacelle of the engine;
- the at least one fluid transfer line is selected from an engine air bleed line, a hydraulic line or a fuel pipe;
- a front portion which carries a leading edge of the brace houses an engine air bleed line which extends between the wing and an air-conditioning system which is integrated in the fuselage;
- at least one hot air portion which is routed in the air bleed line is used or processed in a de-icing system of the leading edge of the brace;
- a rear portion which carries a trailing edge of the brace houses a hydraulic line which extends between an engine and a hydraulic compartment which is integrated in the fuselage and/or a fuel pipe;
- the brace further houses an electrical cable.

Other specific features and advantages of the disclosure herein will be further appreciated from the following description.

BRIEF DESCRIPTION OF THE DRAWINGS

In the appended drawings which are given by way of non-limiting example.

DETAILED DESCRIPTION

Figure 1:
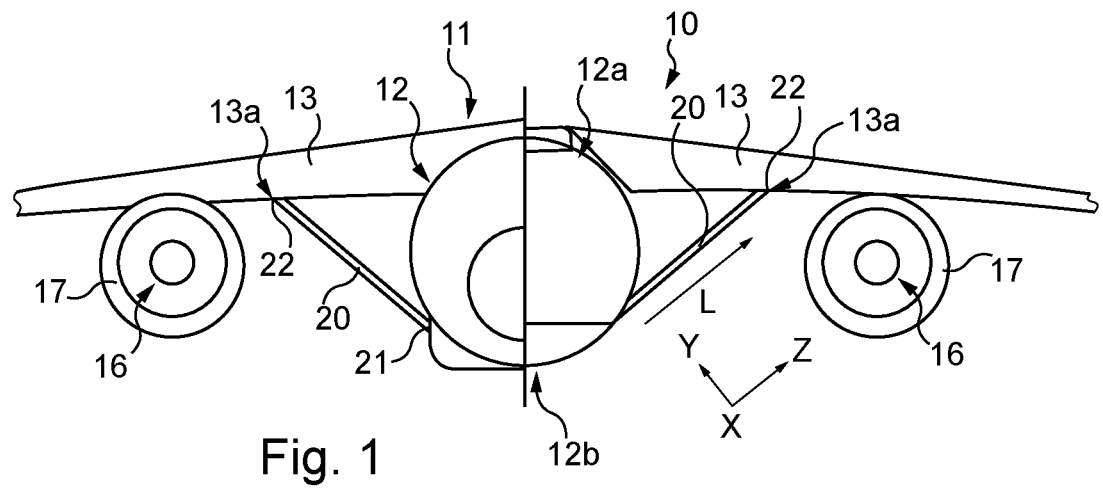
FIG. 1 is a mixed schematic view illustrating from the front (on the left in the Figure) and as a cross-section (on the right in the Figure) an aircraft according to a first embodiment of the disclosure herein.

With reference to FIG. 1, the general structure of an aircraft according to a first embodiment of the disclosure herein is described.

The aircraft 10 comprises a wing 11 and a fuselage 12. As clearly illustrated in FIG. 1, the aircraft is called a high-winged aircraft the two wing members 13 of the aircraft being connected to the fuselage 12 in the upper portion of the fuselage 12. The root of the wing members 13 is thus located in an upper portion 12a of the fuselage. The construction of such a high-winged aircraft 10 is known and does not need to be described in detail here.

Furthermore, the wing members 13 may have, in a non-limiting manner, a great extent at each side of the fuselage 12, thereby increasing the wingspan of the aircraft 10. This configuration of an aircraft is particularly preferred in order to improve the fuel consumption of the aircraft 10.

In order to limit the loads on the wing, the aircraft 10 comprises two braces 20 which are arranged at one side and the other of the fuselage 12. Each brace 20 extends in accordance with the length L in a longitudinal direction with an axis Z in the reference system illustrated in FIG. 1, the cross-section of the brace 20 thereby extending in a plane X, Y perpendicular to the axis Z. Each brace 20 extends in accordance with the length L between a connection zone in the region of the wing 11 and a connection zone with respect to the fuselage 12, in particular a connection zone in the lower portion of the fuselage 12. Each brace 20 is thus in the form of a profile-member, a first end 21 being fixed to the fuselage 12 and a second end 22 being fixed in the region of the wing 11 of the aircraft 10. Each brace 20 is connected to a lower portion 12b of the fuselage 12. As clearly illustrated in the embodiment in FIG. 2, the brace 20 can be fixed in the region of a lower casing 14 of the fuselage 12 located in the lower portion 12b of the fuselage 12.

The lower casing 14 of the fuselage 12 may house different operating systems of the aircraft 10 and, for example, an air-conditioning system 15, a hydraulic compartment, an electrical energy distribution system, etc. The aircraft 10 comprises engines 16 which are mounted on the wing 11, an engine 16 being mounted under each wing member 13. Each engine 16 is received in a nacelle 17, which is fixed under each wing member 13.

In the embodiment illustrated in FIG. 1, and in a non-limiting manner, each brace 20 is fixed to the wing 11, the connection zone 13a of the brace 20 with respect to the wing being located under each wing member 13.

Figure 2:
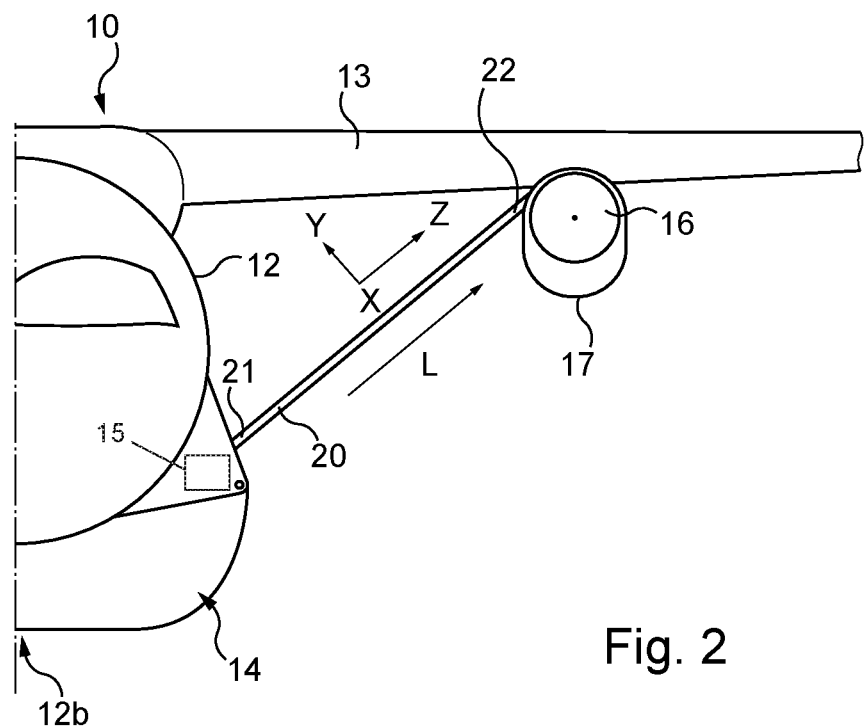
FIG. 2 is a schematic half-view from the front of an aircraft according to a second embodiment of the disclosure herein.

In the embodiment illustrated in FIG. 2, the brace 20 is fixed to the nacelle 17 of the engine 16. In this manner, the second end 22 of the brace 20 is connected to the nacelle 17 of the engine 16.

The brace 20 could also be fixed at any other location and, for example, to a mounting rod of the engine on the wing.

It will be generally noted that the second end 22 of the brace 20 is referred to as being fixed in the region of the wing 11, which means that it is fixed directly to the wing 11 or to the nacelle 17 of the engine 16, or to the rod.

The brace 20 is a rigid structure. It can be produced from a metal profile-member or a composite material which has a rigidity sufficient to withstand the loads which are applied thereto and in particular the compression forces which are generated by each wing member 13 and which are transmitted to the fuselage 12.

Figure 3:
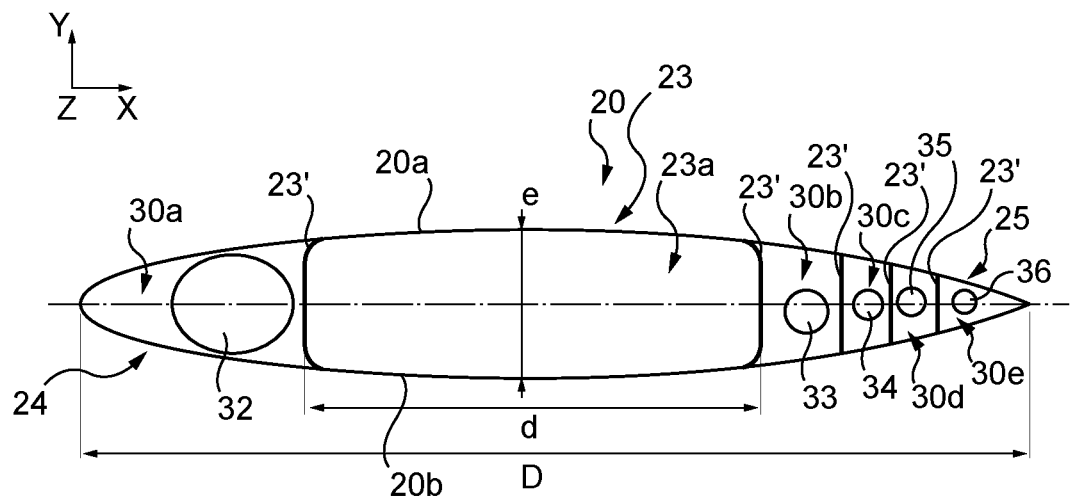
FIG. 3 is a schematic cross-section of a brace with which an aircraft according to an embodiment of the disclosure herein is provided.

As clearly illustrated in FIG. 3, the brace 20 has a cross-section in a plane X, Y which is perpendicular to the length L having the axis Z.

In this instance, the brace 20 comprises two external walls 20a, 20b which extend in accordance with the length L of the brace 20.

In cross-section, the brace 20 has a cross-section which is intended to reduce the aerodynamic drag of the brace 20 and/or contribute to the aerodynamic lift of the aircraft 10.

In this manner, the height e of the brace 20 in the direction Y gradually decreases from a central portion 23 of the brace 20 in the direction of a front portion which carries a leading edge 24, on the one hand, and in a direction of a rear portion which carries a trailing edge 25, on the other hand.

The height e of the brace corresponds to the distance which separates the two external walls 20a, 20b of the brace 20.

The central portion 23 of the brace 20 is in this example formed by a casing 23a which is delimited by the external walls 20a, 20b and internal partitions 23' which extend in accordance with the length L of the brace 20. In this case, the internal partitions 23' delimit the casing 23a which extends substantially in the plane Y, Z.

Figure 4:
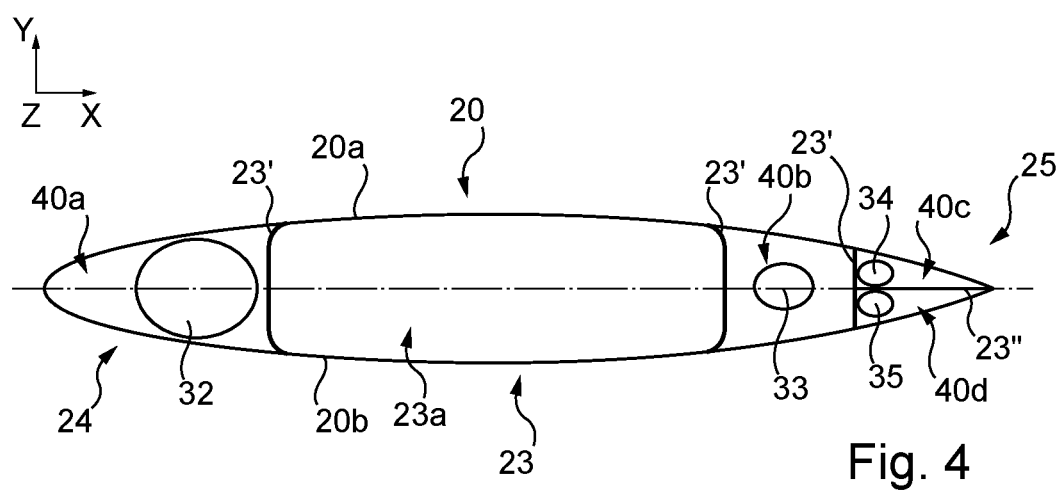
FIG. 4 is a schematic cross-section of a brace with which an aircraft according to another embodiment of the disclosure herein is provided.

In the embodiment illustrated in FIGS. 3 and 4, the working portion of the brace 20 is formed by the casing 23a which is located in the central portion 23 of the brace 20.

Naturally, other brace structures 20 could be used. The working portion could, for example, be formed by the whole of the brace structure, including at the same time the central portion 23 and the front portion which carries a leading edge 24 and the rear portion which carries a trailing edge 25.

In principle, the brace 20 is configured to support the forces which result from the wing, and in particular the traction and compression forces which are generated by the wing member 13.

The critical loads are in particular the compression forces to which the brace 20 is subjected.

A brace 20 may thus be considered to be a straight beam which is loaded by compression charges.

During use, and in particular during the flight of the aircraft, the stability of each brace 20 must be ensured while avoiding buckling.

As clearly illustrated in FIG. 3, the dimensions of the brace 20 in cross-section are characterized by the chord length D in the direction X and a height e in the direction Y.

In this embodiment, the working portion of the brace 20, which is intended to ensure the stability and resistance to buckling, is reduced to only a portion of the chord of the cross-section of the brace 20. In this manner, the working portion of the brace 20 does not extend here over the entire length D of the chord.

In the embodiment illustrated in FIG. 3, the working portion of the brace 20 extends in the central portion 23 in accordance with a dimension d, in the direction X, less than the length D of the chord. As illustrated in FIGS. 3 and 4, the brace 20 houses fluid transfer lines 32, 33, 34 between the wing 11 and the fuselage 12.

In the embodiments illustrated in FIGS. 3 and 4, the zones or passages which exist in the front portion which carries a leading edge 24 and the rear portion which carries a trailing edge 25 are used to receive at least one fluid transfer line. Naturally, such a fluid transfer line could also be received in the casing 23a of the central portion 23 of the brace 20. The brace 20 houses a plurality of fluid transfer lines 32, 33, 34 in partitioned zones 30a-e, 40a-d which extend in accordance with the length L of the brace 20. The partitioned zones thus form longitudinal chambers (or cavities or housings) which extend in accordance with the length L of the brace 20 and which are separated from each other by partitions 23', 23" which also extend in accordance with the length L of the brace 20. The partitions 23', 23" may be formed in a single piece with the brace 20 or in several pieces which are assembled during the production of the brace 20. The brace 20 can be formed by a hollow structure between the external walls 20a, 20b. The partitions 23', 23" delimit at the inner side of the brace 20 partitioned zones 30a-e, 40a-d, in which pipes or lines are routed and form the fluid transfer lines 32, 33, 34.

Alternatively, the brace 20 can be formed by a solid structure between the external walls 20a, 20b, longitudinal indentations in the solid structure of the brace 20 constituting lines for forming the fluid transfer lines 32, 33, 34.

The solid structure of the brace 20 which extends between the longitudinal indentations thus forms separation partitions for the different chambers (or cavities or housings) in which fluid transfer lines 32, 33, 34 extend.

Naturally, the brace 20 may comprise a hollow structure portion and a solid structure portion.

The partitioned zones 30a-e, 40a-d are suitable for each housing a fluid transfer line. They can also be suitable for receiving one or more electrical cable(s) which extend(s) between the wing 11 and the fuselage 12.

The partitioned zones 30a-e, 40a-d thus open at the ends 21, 22 of the brace 20 in order to allow the fluid transfer lines or electrical cables to be introduced in the wing 11 and in the lower portion 12b of the fuselage 12.

By way of non-limiting examples, the fluid transfer line may be:
- an engine air bleed line. An engine air bleed line may be formed by a line which is placed in communication in the region of the exhaust of the engine 16 and which brings about the circulation of the hot air which is taken from the engine 16 and which is intended to supply an air-conditioning system 15 which is integrated in the fuselage 12 of the aircraft. The compressed air of the engine may particularly be conveyed as far as an ECS pack (Environmental Control System) used to produce conditioned air in the pressurized cabin of the aircraft; or
- a hydraulic circuit which extends between the pump of the engine 16 and a hydraulic compartment which is integrated in the fuselage 12; or
- a fuel line which connects a tank which is integrated in the wing member 13 to a fuel supply or withdrawal location of the aircraft 10 located in the lower portion of the fuselage 12.

The electrical cable between the fuselage 12 and the wing 11 is used to carry out different functions and comprises, for example, an electrical supply circuit for different modules which are integrated in the fuselage from the electrical power supplied by the electrical generator of the engine or a transfer circuit for electrical control signals.

The electrical cabling system comprises by way of example:
- the electrical supply between the engine 16 and an electrical energy distribution system which is integrated in the fuselage 12. Electrical cables thus allow the electrical energy distribution system which is integrated in the fuselage 12 to be supplied from the electrical power which is supplied by the generators of the engine 16; or
- conversely, the electrical supply from the electrical energy distribution system which is integrated in the fuselage 12 of different electrical modules which are received in the wing member 13 and, for example, electrical actuators for opening and closing flaperons or ailerons or lighting devices; or
- the transmission of electrical signals from a flight control computer which is fitted on-board in the fuselage 12 in order to control the engine 16 or different electrical modules which are received in the wing member 13 as mentioned above.

The fluid transfer lines and/or electrical cable can thus be routed inside the brace 20 between each wing member 13 and the fuselage 12, preventing those elements from extending along the wing member or outside the fuselage.

There will be described below, with reference to FIGS. 3 and 4, examples of integration of fluid transfer lines and/or electrical cables by way of non-limiting example.

Initially, it may be noted that the type of fluid transfer line and/or electrical cable received in the two braces 20 of the same aircraft may be different, the two braces not affording the same functionalities.

With reference to FIG. 3, a first partitioned zone 30a in the front portion which carries the leading edge 24 of the brace 20 houses an engine air bleed line 32 which thus extends between the engine 16 and an air-conditioning system 15 which is integrated in the fuselage 12.

With the air-conditioning system 15 of the aircraft 10 being generally located in the lower portion 12b of the fuselage 12, the brace 20 thus allows the production of a direct and short routing of the engine air bleed line 32 between the engine 16 under the wing 11 and the air-conditioning system 15 which is positioned in a lower portion 12b of the fuselage 12, as compared with the routing of an engine air bleed line which extends via the fuselage 12.

Furthermore, the air removed from the engine 16 being at a high temperature, at least a portion of the hot air which is routed in the engine air bleed line 32 can be used or processed in a de-icing system of the leading edge 24 of the brace 20.

This de-icing or anti-icing function of the brace 20 can be brought about by a controlled leak in the region of the engine air bleed line 32 similar to a known device which is used to bring about the de-icing of the leading edge of a wing, and which is also referred to as a "piccolo" device, involving the air being directed in a tube in order to bring about the flow of hot air inside a leading edge.

Alternatively or additionally, the de-icing or anti-icing function may also be brought about by radiating the heat of the hot air which flows in the engine air bleed line 32 which is received in the front portion which carries the leading edge 24 of the brace 20.

The use of the hot air which is routed in the engine air bleed line 32 avoids the installation of a specific de-icing system.

Furthermore, during the implementation illustrated in FIG. 3, a second partitioned zone 30b in the rear portion which carries the trailing edge 25 of the brace 20 houses a fuel flow line 33.

The fuel line 33 allows a fuel supply zone to be provided at the height of a man, in the lower portion of the fuselage 12 of the aircraft, without any need for a lift for connecting supply pipes directly to the wing 11.

A third partitioned zone 30c in the rear portion which carries the trailing edge 25 houses a hydraulic circuit 34 which extends between the engine and a hydraulic compartment (not illustrated) which is integrated in the fuselage.

The brace 20 thus constitutes a direct and short path of the hydraulic circuit 34 between the engine 16 under the wing 11 which supplies the hydraulic power and the hydraulic compartment which is generally located in the lower portion of the fuselage 12, as compared with the path of a hydraulic circuit which extends via the fuselage 12.

Furthermore, the rear portion which carries the trailing edge 25 comprises in this instance a fourth partitioned zone 30d which receives an electrical cable and, for example, an electrical supply cable 35 between the engine 16 and an electrical distribution system (not illustrated) integrated in the fuselage 12.

Finally, a fifth partitioned zone 30e in the rear portion which carries the trailing edge 25 of the brace 20 houses an electrical cable 36 for the transmission of signals between the fuselage 12 of the aircraft and different modules which are integrated in the wing member 13.

In the embodiment of FIG. 3, the partitions 23' extend substantially parallel with each other in the plane Y, Z.

Naturally, the type of elements integrated in the partitioned zones 30a-e, the number of partitioned zones 30a-e and the distribution thereof between the front portion which carries the leading edge 24 and the rear portion which carries the trailing edge 25 of the brace are in no way limiting. In this manner, a second embodiment is illustrated in FIG. 4, the common portions having the same reference numerals.

A first partitioned zone 40a in the front portion which carries the leading edge 24 of the brace 20 houses, as above, an engine air bleed line 32. In the rear portion which carries the trailing edge 25, a second partitioned zone 40b houses a fuel line 33 and a third partitioned zone 40c houses a hydraulic circuit 34.

A fourth partitioned zone 40d houses an electrical supply cable 35 between the engine and an electrical distribution system which is integrated in the fuselage 12.

It will be noted that the first and second partitioned zones 40a and 40b are delimited in this instance inside the structure of the brace 20 by partitions 23' which extend in the plane Y, Z.

The third partitioned zone 40c and the fourth partitioned zone 40d are separated from each other by a partition 23" which extends in the plane X, Z.

Naturally, the positioning of the partitions 23', 23" is variable and can be adapted within the brace 20.

The routing of the circuits and electrical cables in each brace 20 prevents the introduction of those circuits and cables in the pressurized zone of the cabin of the aircraft and thereby simplifies the production of the aircraft.

As a result of the direct routing of the circuits and electrical cables through each brace 20, the length of those circuits and electrical cables can be reduced. The mass of the aircraft can thereby be reduced, thereby increasing the effectiveness levels of the aircraft, in particular in terms of fuel consumption.

The brace 20 thereby has a double function, a structural function and a function of routing the systems of the aircraft. The brace 20 allows a functional connection between the systems which are received in the wing and those received in a lower portion 12b of the fuselage 12.

The present disclosure is not limited to the embodiments described above.

In particular, the brace may be fixed to the wing in a connection zone which is remote from the zone for mounting the engine, it being able to be offset in the direction of an end of the wing. The brace may also be fixed to the wing member in the zone located between the fuselage and the connection zone of the engine with respect to the wing member.

The disclosure herein is further not limited to braces with which a high-winged aircraft with a great wingspan is provided.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage;
   a wing in an upper portion of the fuselage; and
   at least one brace, which extends between the wing and a lower portion of the fuselage, which comprises a central portion, a front portion, and a rear portion,
   wherein one or more fluid transfer lines extend in the front portion, and/or in the rear portion the brace houses one or more fluid transfer lines between the wing and the fuselage.

2. The aircraft according to claim 1, wherein the brace is fixed to the wing.

3. The aircraft according to claim 1, wherein an engine is mounted on the wing and the brace is fixed to a nacelle of the engine.

4. The aircraft according to claim 1, wherein the one or more fluid transfer lines are an engine air bleed line, a hydraulic line, or a fuel pipe.

5. The aircraft according to claim 1, wherein the rear portion, which carries a trailing edge of the brace and houses a hydraulic line, which extends between an engine and a hydraulic compartment integrated in the fuselage, and/or a fuel pipe.

6. The aircraft according to claim 1, wherein the brace houses an electrical cable.

7. The aircraft according to claim 1, wherein the brace is devoid of any fluid transfer lines passing through the central portion.

8. The aircraft according to claim 1, wherein the front portion, which carries a leading edge of the brace and houses an engine air bleed line, which extends between the wing and an air-conditioning system integrated in the fuselage.

9. The aircraft according to claim 8, wherein at least one hot air portion routed in the engine air bleed line is configured to be used in a de-icing system of the leading edge of the brace.

10. The aircraft according to claim 1, wherein the one or more fluid transfer lines are a plurality of fluid transfer lines that are located in a plurality of partitioned zones, respectively, which extend in accordance with a length of the brace.

11. The aircraft according to claim 10, wherein the brace is fixed to the wing.

12. The aircraft according to claim 10, wherein an engine is mounted on the wing and the brace is fixed to a nacelle of the engine.

13. The aircraft according to claim 1, wherein:
the brace comprises:
the central portion is in a form of a casing, wherein the casing is delimited by external walls of the brace and internal partitions of the brace, the external walls and the internal partitions extending along a length of the brace;
the front portion, which carries a leading edge; and
the rear portion, which carries a trailing edge, and
the one or more fluid transfer lines extend in the front portion, which carries the leading edge, and/or in the rear portion, which carries the trailing edge.

14. The aircraft according to claim 13, wherein the one or more fluid transfer lines are a plurality of fluid transfer lines that are located in a plurality of partitioned zones, respectively, which extend in accordance with a length of the brace.

15. The aircraft according to claim 13, wherein the brace is fixed to the wing.

16. The aircraft according to claim 13, wherein an engine is mounted on the wing and the brace is fixed to a nacelle of the engine.

17. The aircraft according to claim 13, wherein the one or more fluid transfer lines are one or more first fluid transfer lines in the front portion, which carries the leading edge, and one or more second fluid transfer lines in the rear portion, which carries the trailing edge.

18. The aircraft according to claim 17, wherein the one or more fluid transfer lines are a plurality of fluid transfer lines, including the first and second fluid transfer lines, that are located in a plurality of partitioned zones, respectively, which extend in accordance with a length of the brace.

19. The aircraft according to claim 17, wherein the brace is fixed to the wing.

20. The aircraft according to claim 17, wherein an engine is mounted on the wing and the brace is fixed to a nacelle of the engine.

\* \* \* \* \*